United States Patent

[11] 3,576,061

[72] Inventor Gotthold Pahlitzsch
 Braunschweig, Germany
[21] Appl. No. 810,159
[22] Filed Mar. 25, 1969
[45] Patented Apr. 27, 1971
[73] Assignee National Twist Drill and Tool Company
 Canton, Ohio
[32] Priority Nov. 28, 1968
[33] Germany
[31] P 18 11 374.1

[54] CIRCULAR SAWS WITH FACETED TEETH
 2 Claims, 4 Drawing Figs.
[52] U.S. Cl. ................................... 29/105,
 29/95, 143/133
[51] Int. Cl. ................................... B26d 1/12,
 B26d 1/00, B23p 15/28
[50] Field of Search ........................ 29/95, 95.4,
 103, 103.1; 143/133, 133—7, 140, 140—1,
 140—2

[56] References Cited
UNITED STATES PATENTS

| | | | |
|---|---|---|---|
| 543,608 | 7/1895 | Beale | 29/103 |
| 1,861,218 | 5/1932 | Huther | 29/103X |
| 2,476,749 | 7/1949 | Harsh | 29/103 |
| 2,658,260 | 11/1953 | Hage | 29/103 |
| 2,671,947 | 3/1954 | Vander Linde | 29/103 |
| 2,720,229 | 10/1955 | Drake | 29/95X |
| 3,169,435 | 2/1965 | Segal | 29/95 |
| 3,358,720 | 12/1967 | Henderson | 143/133 |
| 3,362,446 | 1/1968 | Potomak | 143/133 |

Primary Examiner—Harrison L. Hinson
Attorney—John D. Haney

ABSTRACT: A cutter such as a circular saw includes carbide-tipped teeth with negatively raked frontal faces and plane-shearing faces which flare rearwardly and laterally outward to form cutting edges at the intersection of the top face of the tooth. The foregoing teeth may serve as the low teeth of a triple-chip-style saw in which high center-cutting teeth are disposed alternately between the low teeth. The high teeth are also provided with a negatively raked frontal face.

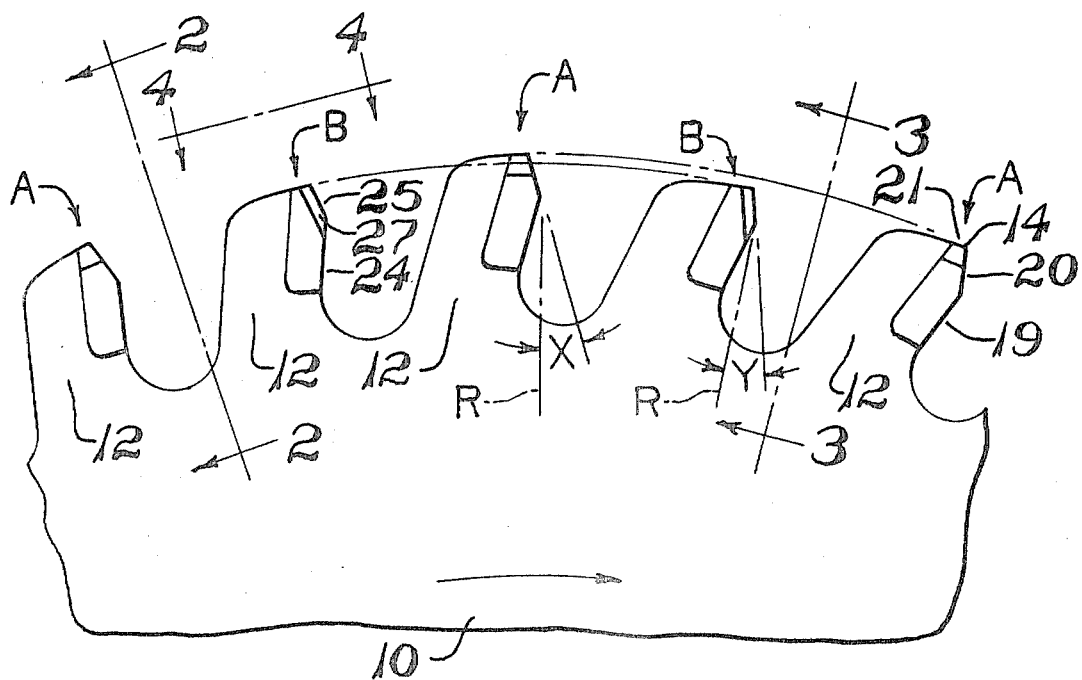
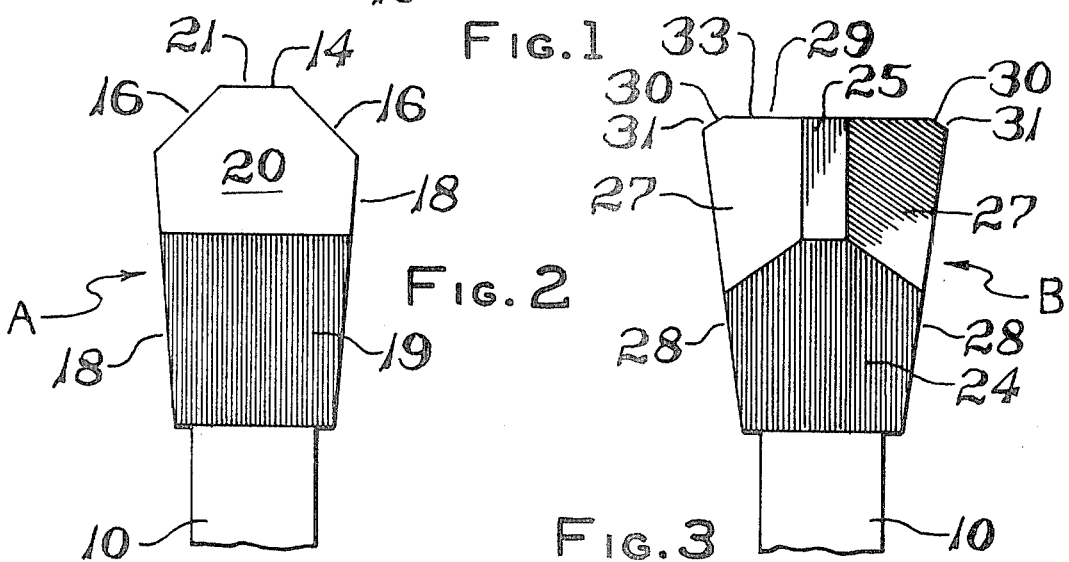

CIRCULAR SAWS WITH FACETED TEETH

REFERENCE TO RELATED APPLICATIONS

The subject matter of this application is closely related to applicant's U.S. application Ser. No. 838,721 filed Mar. 25, 1969.

CIRCULAR SAWS WITH FACETED TEETH

This invention relates to rotatable circular saws and related cutters such as side-milling cutters and is particularly useful for sawing hard steel plates, ingots and the like. The invention is especially adapted to and is ordinarily practiced with saws of the class in which cutting teeth include inserts of very hard material such as tungsten carbide. Although the invention is explained with reference to its use in saws, the term "saw" is intended to include milling cutters and related tools.

BACKGROUND OF THE INVENTION

Prior to this invention the best quality circular saws have had little utility for cutting hard ferrous materials because such circular saws promptly became dull and damaged from the cutting loads. Consequently, the most common practice has been to saw thick steel plates (e.g. 4 to 12 inches in thickness) or billets or ingots of similar dimensions with slow-moving band or reciprocating saws. Such operations ordinarily took many hours or even days to complete. In contrast, saws made according to this invention can be operated for cutting hard alloy steel at speeds of 700 r.p.m. and with feed speeds of 50 inches per minute. A typical sawing operation can be reduced to minutes and the saws remain undamaged and retain their cutting efficacy far longer than any saws previously known for this service.

SUMMARY OF THE INVENTION

The foregoing results are obtained primarily by the special faceted tooth configuration provided by this invention. These faceted teeth are each shaped with a positive hook or rake angle on the lower part of their front face, and with a negative rake angle near their radially outer sides. Moreover, these teeth have beveled shearing faces arranged symmetrically of the midplane of the tooth and which flair rearwardly from the negative hook region of the front face of the tooth to laterally outer cutting corners which trail the front face of the tooth as the saw rotates.

Teeth of the foregoing configuration may be utilized in the well-known triple-chip-style sawtooth patterns as the "low" teeth of these patterns. In the triple-chip-style saws the leading "high" teeth may also embody a negative rake angle along the radially outer region of their leading faces. In these triple-chip teeth patterns the leading "high" tooth normally removes a chip along the center of the kerf approximately equal to one-third the overall width of the kerf, whereas the trailing "low" teeth remove two chips flanking the center chip. The lateral cutting corners of the low teeth therefore shape the surfaces of the kerf and in this saw the cutting is accomplished with the kerf surfaces remarkably smooth and burr free.

Saws made according to this invention also operate very effectively for cutting nonferrous metals and the common industrial plastic materials. The teeth configuration explained herein may also be adapted to other styles of multiple teeth saws.

DESCRIPTION OF THE DRAWINGS

The accompanying drawings show one example of a carbide-tipped saw of triple-chip style made according to and embodying this invention. In the drawings:

FIG. 1 is a fragmentary side view of the periphery of a saw showing the profile of the cutting teeth; and FIGS. 2—4 are detailed views of the teeth taken approximately along the reference lines marked with the numbers corresponding to the FIG. numbers.

Referring to FIG. 1, a saw is made with a thin circular disc 10 of conventional saw blade steel and has a series of peripheral teeth 12 of uniform shape uniformly distributed around the periphery of the disc 10. Each tooth 12 has a cutting insert marked either A or B of a very hard durable carbide material such as tungsten carbide brazed into a complementary recess formed in the front region of each tooth 12.

The carbide tips A are ground (or otherwise shaped) to form the "high" leading teeth, and have a radially outer cutting edge 14 projecting radially beyond the corresponding outermost portion of the trailing "low" teeth B. Teeth A and B are alternately arranged around the entire periphery of the saw.

Referring to FIG. 2, each leading tooth A is approximately of keystone shape in its frontal aspect with its outermost cutting edge 14 at the center of it and at its outer peripheral edge. Flanking the ends of the cutting edge 14 are plane beveled faces 16–16 which slope downwardly to merge with the laterally outwardly converging sides 18–18 of the tooth. The maximum width of each tooth A is narrower than the width of its mating tooth B so that only edge 14 actually cuts against a workpiece. The frontal face 19 of each tooth A has a positive rake angle along its lower portion, but near its radially outer portion the frontal face portion 20 has a negative rake angle leading to cutting edge 14. Cutting edge 14 is formed at the intersection of the plane negatively raked front surface 20 and the plane top surface 21 which leads rearwardly from edge 14. The negative rake angle of face 20 is indicated at dimension X in FIG. 1 and this angle may be from 2° to about 25°. Preferably the angle will be from about 15° to about 18°. This angle is measured between a radius $R$ of the saw drawn through the intersection 21 of the front face 19 and front face 20, and the plane of the front face 20 as shown at dimension X.

Each "low" or trailing tooth B, as best shown in FIG. 3, has a lower or radially inner front face 24 with a positive rake angle, and a narrow central outer front face 25 formed with a negative rake angle as indicated by dimension Y in FIG. 1. The outer front face 25 lies at the midplane of the saw and is comparatively narrow. Flanking each side of face 25 are plane shearing faces 27, 27 which flair backwardly and outwardly from face 25 until they merge or intersect with the lateral sides 28–28 of the low tooth. The faces 27, 27 also merge or intersect the outer face 29 of each low tooth and faces 27, 27 define laterally outer cutting corners 30–30 at the junction of faces 27–27 with sides 28–28 and the top face 29.

The outer top faces 29 are slightly beveled at 31 and it is the regions along these bevels 31 near corners 30–30 of the tooth which operate as the cutting edges of the tooth to remove the side chips in a kerf and also provide the surface finish on the sawed parts.

The shearing faces 27–27 are angled backward from negatively raked face 25 by an angle Z shown in FIG. 4. This angle Z may vary from between about 5° and about 25° but preferably it will be about 15°.

The terms "negatively raked" or "positively raked" faces described herein are used in the way which is conventional in this art. Angle X in FIG. 1 is "negative" meaning the angle is measured counterclockwise from radius R. If the angle is measured in a clockwise direction from radius R, then such angle is said to be "positive."

In the embodiment illustrated in which the teeth A and B provide a triple-chip cutting action, cutting edge 14 of each tooth A is offset radially outward from the radially outermost edge 33 of each tooth B by an amount indicated in the chain-dotted lines of FIG. 1.

I claim:

1. A circular cutter such as a saw having a hard disclike body with cutting teeth at its periphery including teeth (B) characterized by:
   a. a radially outer front face (25) with a negative rake angle relative to the radial direction of the cutter; and b. two plane shearing faces (27, 27) angling backward and flaring laterally outward from the margins of said front face (25);

c. said shearing faces intersecting a top surface (29) of said tooth and lateral sides (28, 28) of said tooth to form laterally opposed cutting corners (30, 30) and cutting edges (31, 31).

2. A circular cutter according to claim 1 and further comprising teeth (A) having a radially outer central cutting edge (14) at the intersection of a negatively raked front face (20) and a top surface (21) of the tooth, said teeth (A) being arranged alternately between said teeth (B) to provide a triple-chip cutting action.